(12) United States Patent
Smith et al.

(10) Patent No.: US 6,220,618 B1
(45) Date of Patent: Apr. 24, 2001

(54) TRANSLATABLE TRAILER HITCH

(76) Inventors: Philip Smith; Joann Smith, both of 19186 Shosone, Bend, OR (US) 97702

( * ) Notice: Subject to any disclaimer, the term of this patent is extended or adjusted under 35 U.S.C. 154(b) by 0 days.

(21) Appl. No.: 09/354,541

(22) Filed: Jul. 15, 1999

(51) Int. Cl.[7] .................................................. B60D 1/34
(52) U.S. Cl. ..................... 280/447; 280/483; 280/455.1
(58) Field of Search .................................. 280/484, 483, 280/489, 446.1, 447, 455.1, 456.1

(56) References Cited

U.S. PATENT DOCUMENTS

| 1,986,231 | * | 1/1935 | Thomas | 280/484 |
| 2,092,597 | * | 9/1937 | Benjamin et al. | 280/484 |
| 2,501,721 | * | 3/1950 | Hagenah | 280/484 |
| 3,425,715 | * | 2/1969 | Weitz | 280/446.1 |
| 5,160,157 | * | 11/1992 | Hubler | 280/423.1 |

FOREIGN PATENT DOCUMENTS

| 29162 | * | 12/1931 | (AU) | 280/484 |
| 95779 | * | 8/1921 | (CH) | 280/484 |

* cited by examiner

*Primary Examiner*—J. J. Swann
*Assistant Examiner*—Michael Cuff
(74) *Attorney, Agent, or Firm*—Donn K. Harms

(57) ABSTRACT

A Trailer hitch for towing a four wheeled vehicle. The hitch has a fixed in place portion attached to the towing vehicle and a translatable portion attached to the vehicle being towed. The translatable portion is spring biased to a center position. A damper is attached between the fixed portion and the translatable portion to prevent abrupt movement of the translatable portion. The hitch provides controlled lateral movement between the towing vehicle and the towed vehicle to diminish wear on the front end parts and tires of the towed vehicle.

8 Claims, 1 Drawing Sheet

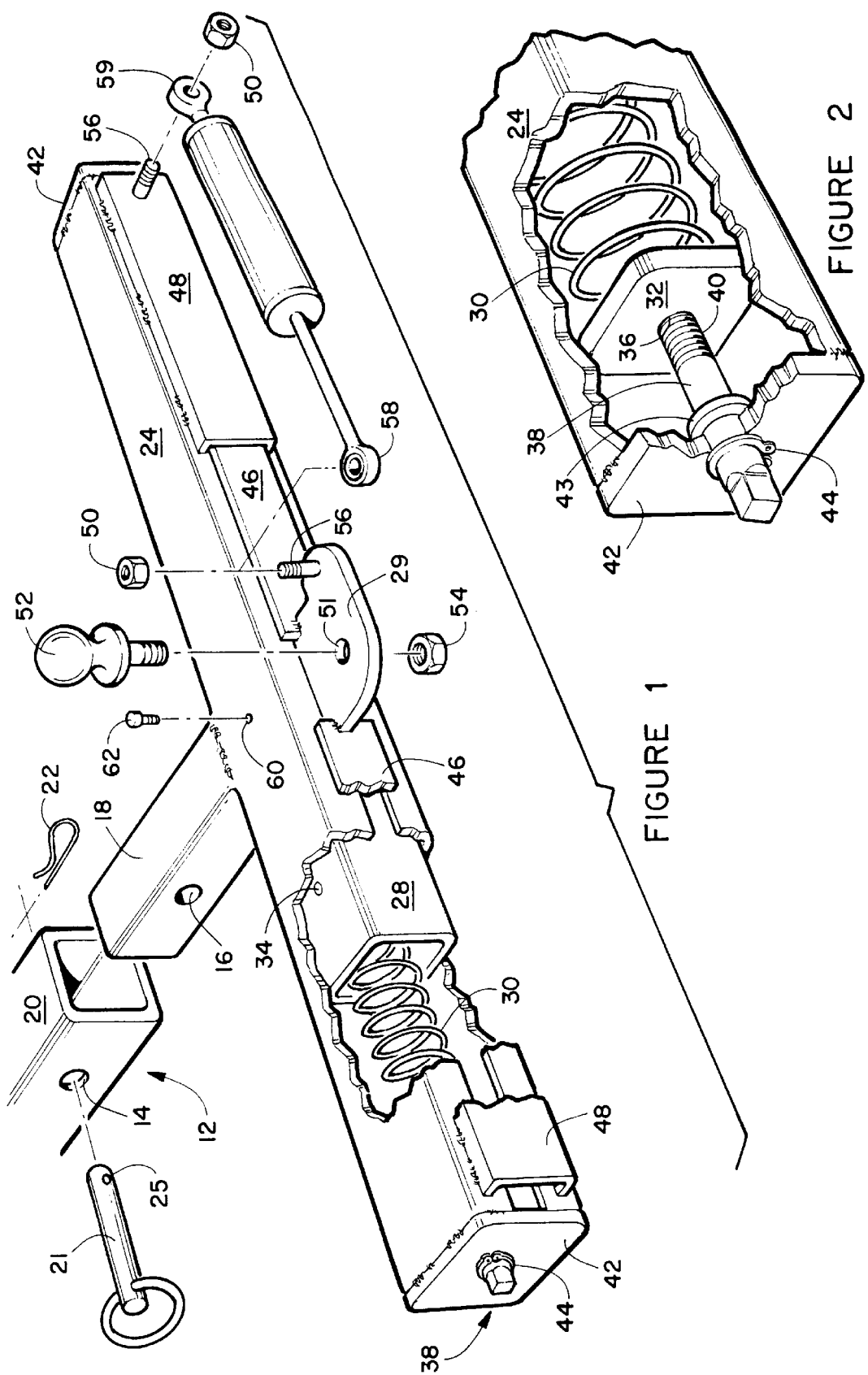

TRANSLATABLE TRAILER HITCH

BACKGROUND OF THE INVENTION

1. Field of the invention

This invention relates to improving operation of a fixed trailer hitch on a towing vehicle by providing controlled lateral movement between the towing vehicle and the towed vehicle to diminish wear on the front end parts and tires of the towed vehicle.

2. Prior Art

U.S. Pat. No. 2,092,597 teaches a draft coupling between a tractor and a wheel supported implement to allow for short turns for the tractor and implement. The coupling includes relative vertical and horizontal movement of the tractor and wheeled implement.

U.S. Pat. No. 2,501,721 teaches, like patent U.S. Pat. No. 2,092,597 above, dampened vertical and horizontal between a trailer vehicle and a tractor vehicle.

U.S. Pat. No. 3,118,688 teaches a laterally and up and down shiftable hitch with resilient mounting for use by a tractor pulling a railroad car.

U.S. Pat. No. 3,353,842 teaches drift means for inter connecting towing vehicle and trailer. The structure provides relative lateral movement between the towing vehicle and the towed trailer. Leaf springs are provided to prevent disconnection between the vehicle and trailer.

There is a continuing need for an improved connection for controlling lateral movements between a towing vehicle and a towed vehicle to improve towing capabilities. The instant invention provides an advancement in relative lateral control between a towing vehicle and a towed vehicle, trailer of the like.

BRIEF DESCRIPTION OF THE DRAWING FIGURES

FIG. 1 is an exploded partial cutaway showing of the improved towing hitch of the invention and FIG. 2 depicts a partial cutaway showing of the spring biasing control of FIG. 1.

DETAILED DESCRIPTION OF THE PREFERRED EMBODIMENT OF THE INVENTION

Referring now to the drawing Figures, the hitch 10 is attachable to a conventional draw bar receiver 20. The connection is accomplished in a conventional and well-known manner by the mating (not shown) of the apertures 14 and 16 respectively of the distal end 18 to the receiver 20. A pin 21 extends through the aligned apertures and is secured by means of a cotter pin 22 inserted within aperture 25 at the end of the connector pin 21.

Fixedly attached to the draw bar end 18 of the hitch 10 is a channel member 24 positioned normal to the distal end 18 by welding, which is preferable, or by any other conventional metal to metal fixed attachment means suitable for the purpose intended.

The channel member 24 is depicted as rectangular in cross-section has a hollow center with an elongated slot 26 that extends along the horizontal length of the channel 24. A translating member 28 is positioned within the channel 24 and extends outward therefrom as a hitch ball receiving platform 29 through the slot 26 for translation along the slot.

The hollow center of the channel 24 receives two coil springs 30 with one positioned at each end thereof for maintaining the towed vehicle in a bias neutral straight away position. The coil springs are captive between an end plate 32 and a pin 34, one for each spring (see drawing FIG. 2), carried by the translating member 28 that extend vertically through apertures in the translating member 28 and are held in place by a friction fit or otherwise attached in the apertures in the translating member or a counter set bolt may be utilized. The only consideration in using a friction fit pin or a counter sunk bolt is that the translating member 28 must be free to translate within the hollow center of the channel 24.

Referring now specifically to drawing FIG. 2, the end plates 32, only one shown for ease of description as the opposite end is identical, has a threaded aperture 36 and can be selectively translated toward or away from the channel end plates 42 by the rotation of bolt 38 that has threads 40 which mate with threaded aperture 36 through end plates 32. Rotating the bolt 38 adjusts the position of the plate 32 relative to the end plate 42. The bolt 38 is held in place for free rotation on end plate 42 by means of a washer 43 fixedly attached to the bolt 38 on one side of plate 42 and a spring keeper 44 on the opposite side of plate 42 from the washer 43. The adjustment of the longitudinal position of the end plates 32 relative to channel ends 42 allows for a selective adjustment of the tension of the associated coil spring.

Brackets 46 cover a portion of the slot 26 and are fixedly attached to member 29 by welding or a like suitable attachment means suitable for the purpose intended, and translate therewith within the inner portion of "C" brackets 48 that are fixedly attached to the channel 24 by welding or the like suitable for the purpose intended. The brackets 48 provide strength to the channel 24 by being fixedly positioned across the slot 26.

The hollow center of the channel 24 receives a coil spring 30 at each end thereof. The coil springs are captive between end plates 32, one for each spring (see drawing FIG. 2), and pins 34 carried by member 28. The brackets 48 and the translating members 46 cover the slot 26 in the channel 24 and prevent dust or other foreign matter from entering between the translating member 28 and the inner surface of the channel 24.

The extension 29 of the member 28 includes an aperture 51 for receiving a conventional hitch ball 52 which is held in place by a nut 54. One side of the extension 29 adjacent to one end surface is positioned an upstanding bolt 56. The bolt 56 receives the translating end 58 of a hydraulic damper 60. The damper is like a vehicle steering damper that prevents resistance to sudden transitory movement of the translating member 28. The damper housing end 59 is likewise attached to an upstanding bolt 56 on one end of a bracket 48 that is adjacent to the other upstanding bolt 56. Nuts 50 hold the damper 60 in place on the bolts.

The hitch 10 when attached between a towing vehicle and a vehicle such as a car or a four-wheel trailer, not shown, in position for towing allows the towing vehicle to make necessary turns etc. and allows the towed vehicle or trailer to follow the towing vehicle while controlling the degree of translation of the translating member 28 that is attached to the vehicle being towed. This feature prevents the towed vehicle from being pulled sideways causing excessive wear on the towed vehicle's front end parts and the tires.

When going around a corner and the brakes are applied the damper 60 controls the lateral movement of the towing vehicle.

The coil springs 30 cause the translating member 28 to return to a center bias neutral position when the towing vehicle is traveling along a substantially straight path.

An aperture 63 is provided in the top of the channel 24 to allow the insertion of a dry or liquid lubricant to maintain ease of translation of the member 28 within the channel 24. A plug 62 seals off the opening in aperture 63 when not in use. The plug 62 is sized in length so as not to interfere with the translation of the translating member 28.

While an embodiment of the invention has been described, obviously variations and modifications are possible without departing therefrom. It is desired to cover all variations as would be apparent to one skilled in the art, and that come within the scope of the appended claims.

What is claimed is:

1. An improved hitch for towing a vehicle which comprises;
    a draw bar connection to a towing vehicle receiver;
    an elongated channel secured to said draw bar transverse to said draw bar;
    an elongated translatable member within said elongated channel;
    end plates extending across opposite ends of said elongated channel;
    coil springs between said end plates and said elongated translatable member to bias said elongated translatable member toward a central location in said elongated channel;
    a plate member secured to said elongated translatable member an extending through a channel opening in said elongated channel; and
    means for securing a hitch ball to said plate member.

2. The improved hitch according to claim 1, further including a hydraulic damper connected between one end of said elongated channel and said plate member to damp movement of said elongated translatable member along said elongated channel.

3. The improved hitch according to claim 1 further including a closure means closing ends of said elongated channel and means for adjusting the positions of said end plates relative to said closure means so that tension in said coil springs may be adjusted.

4. The improved hitch according to claim 3 wherein said means for adjusting end plate position comprises a bolt extending through said closure means for rotation relative to said closure means without axial movement and threaded into a hole in said end plate whereby rotation of said bolt will cause axial movement of said end plate relative to said closure means.

5. The improved hitch according to claim 1 further including pins extending across ends of said elongated translatable member for engaging said coil springs.

6. An improved hitch for towing a vehicle which comprises;
    a draw bar connection to a towing vehicle receiver;
    an elongated channel secured to said draw bar transverse to said draw bar;
    an elongated translatable member within said elongated channel;
    end plates extending across opposite ends of said elongated channel;
    coil springs between said end plates and said elongated translatable member to bias said elongated translatable member toward a central location in said elongated channel;
    a closure means closing ends of said elongated channel and means for adjusting the positions of said end plates relative to said closure means so that tension in said coil springs may be adjusted;
    a plate member secured to said elongated translatable member an extending through a channel opening in said elongated channel;
    means for securing a hitch ball to said plate member; and
    a hydraulic damper connected between one end of said elongated channel and said plate member to damp movement of said elongated translatable member along said elongated channel.

7. The improved hitch according to claim 6 wherein said means for adjusting end plate position comprises a bolt extending through said closure means for rotation relative to said closure means without axial movement and threaded into a hole in said end plate whereby rotation of said bolt will cause axial movement of said end plate relative to said closure means.

8. The improved hitch according to claim 6 further including pins extending across ends of said elongated translatable member for engaging said coil springs.

* * * * *